Figure 1:
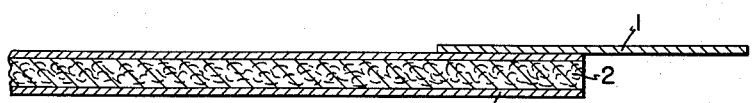
Figure 2:
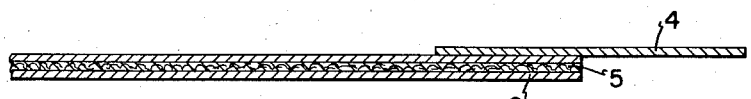
Figure 3:

Sept. 9, 1952     J. B. BRENNAN     2,610,220

STORAGE BATTERY ELECTRODE

Filed July 24, 1948

*INVENTOR.*
JOSEPH B. BRENNAN
BY *West & Oldham*
ATTORNEYS

Patented Sept. 9, 1952

2,610,220

UNITED STATES PATENT OFFICE 2,610,220

STORAGE BATTERY ELECTRODE

Joseph B. Brennan, Cleveland, Ohio

Application July 24, 1948, Serial No. 40,609

1 Claim. (Cl. 136—59)

This invention relates to electric storage batteries and to electrodes therefor.

The present invention, broadly speaking, can be said to comprise to provide the provision of a storage battery electrode wherein the electrode is made from a fibrous base material which is impregnated with active material and which has a layer of porous metallic particles in conductive relation to the active material.

According to this invention electrodes for storage batteries comprise a layer of porous spray-deposited or sintered metal particles superimposed on and penetrating into a layer of fibrous material such as paper, asbestos, Fiberglas, gauze, cards or cords, glass, metallic filaments or wires, or such materials in combination so arranged that a thin strong suitable porous base is had so that layers of metal particles may be spray-deposited thereon or thereover or layers of metal particles may be spread thereon and sintered to form a porous conductive element. Thinness in the fibrous base is desirable so that the particles of metal are imbedded therein when or after applied. Thus fibrous layers from .001" to .010" are preferred. Softness and looseness is desired so that the metal particles will embed therein. Penetration of the fibrous base by the metallic particles and attachment thereto is desirable. Conductive metallic filaments may be used as base if arranged parallel or woven or non-conductive textile fibers synthetic or natural may be used.

According to this invention I am able to make storage batteries wherein on a 3" by 5", i. e. a 15 square inch area flat positive plate, a 15 ampere current is given off on short circuit. Thus I am able to secure at least one ampere per square inch of positive plate.

The above results were secured with an electrode having spray deposits having less than .010" on each side and penetrating into the fibrous base so that electric conduction exists between each layer. It is also preferable that the edges of such material extend therearound so as to assist in the conduction throughout the plate. In any case electrodes made according to my invention are conductive throughout and porous throughout and contain active material within the interstices thereof.

It is also possible to use several layers of base material having orifices therein the layers being spray-deposited in face-to-face relation or sintered in superimposed layers which layers may be subsequently parted and used separately as electrode material.

It is desirable to impregnate the fibrous base with suitable paste accumulator active material and at least partially dry same prior to affixing the porous metallic layers thereto.

Thus two layers of gauze about 40 count may be superimposed and impregnated with a paste of nickel hydroxide in 21% potassium hydroxide solution, then at least partially dried and then sprayed with molten nickel particles so that the nickel particles penetrate into the interstices thereof and over the surface thereof making the resulting article porous and conductive and coherent throughout and containing active material and fibers therein. The impregnation of combustible fibrous materials with the paste of active materials lessens their tendency to carbonize under heat.

It is essential that the base materials be kept at a temperature below the melting point of the applied metal particles in any case or by passing same over cooled metallic surfaces during the application and bonding of the metal particles thereto and therein and thereon.

A relatively inert atmosphere assures better bonding of the metal particles. The spraying action may be effected in an enclosed chamber which can have an inert atmosphere provided therein.

It is desirable in some cases to pass the base material over flat cooling surfaces when spraying in order to avoid the bending thereof and fracturing of the so-produced electrode material, especially when spraying high temperature materials such as iron, nickel, etc.

The active material may be applied to the sprayed member by a vacuum and pressure impregnation, pressure or gravity impregnation, the combination of a gravity and pressure or vacuum and pressure impregnation plus a mechanical pasting or spraying operation, chemical conversion by impregnating with nitrates, for example and converting with potassium hydroxide solution thereafter, either along or combined with vacuum and pressure or gravity impregnation, mechanical pre-mixing and sheeting of the base material and the active material prior to combination with the active porous conductive metallic layers with subsequent impregnation after the application of the metallic layers, or by a combination of any of the above methods.

The deposition of molten metal particles as by spraying is preferably so set up and controlled that although the molten metal particles are spaced from each other in transit from the spray gun and the deposit produced is in the form of a coherent conductive porous layer and the successive metal particles in the spray stream are joined as they deposit.

Referring to the drawings herewith:

Fig. I represents a fibrous cord base 2 impregnated with active material and spray-deposited with molten metal 3 Fig. I. The molten spray-deposit may extend into the fibrous base. 1 Fig. I is terminal tab.

Fig. II represents a thin asbestos paper base material having fibrous reinforcements therein of metal or textile fibers woven or unwoven 5 Fig. II and impregnated with active material and having a porous molten metal spray-deposit thereover and therein 6 Fig. II and having a terminal tab 4 Fig. II welded or otherwise attached to the porous molten metal spray deposit.

Fig. III represents a layer of active material 8 Fig. III in and over a layer of filamented material 9 Fig. III and having a coherent conductive porous layer of sintered or spray-deposited metal particles 10 Fig. III thereover and therein and a metal terminal 7 Fig. III attached to the metal particles 10 Fig. III.

Having described my invention what I claim is:

A storage battery electrode comprising a fibrous porous base including conductive filaments and non-conductive fibers, a porous coherent conductive metallic coating impregnated with active material in conductive relationship with the fibrous base, said fibrous base being impregnated with active material.

JOSEPH B. BRENNAN.

REFERENCES CITED

The following references are of record in the file of this patent:

UNITED STATES PATENTS

| Number | Name | Date |
|---|---|---|
| 1,128,058 | Schoop | Feb. 9, 1915 |
| 1,509,186 | Benner et al. | Sept. 23, 1924 |
| 2,251,913 | Brennan | Aug. 12, 1941 |
| 2,304,073 | Brennan | Dec. 8, 1942 |
| 2,330,202 | Brennan | Sept. 28, 1943 |

FOREIGN PATENTS

| Number | Country | Date |
|---|---|---|
| 89,926 | Austria | Nov. 10, 1922 |
| 161,659 | Switzerland | July 17, 1933 |